ns

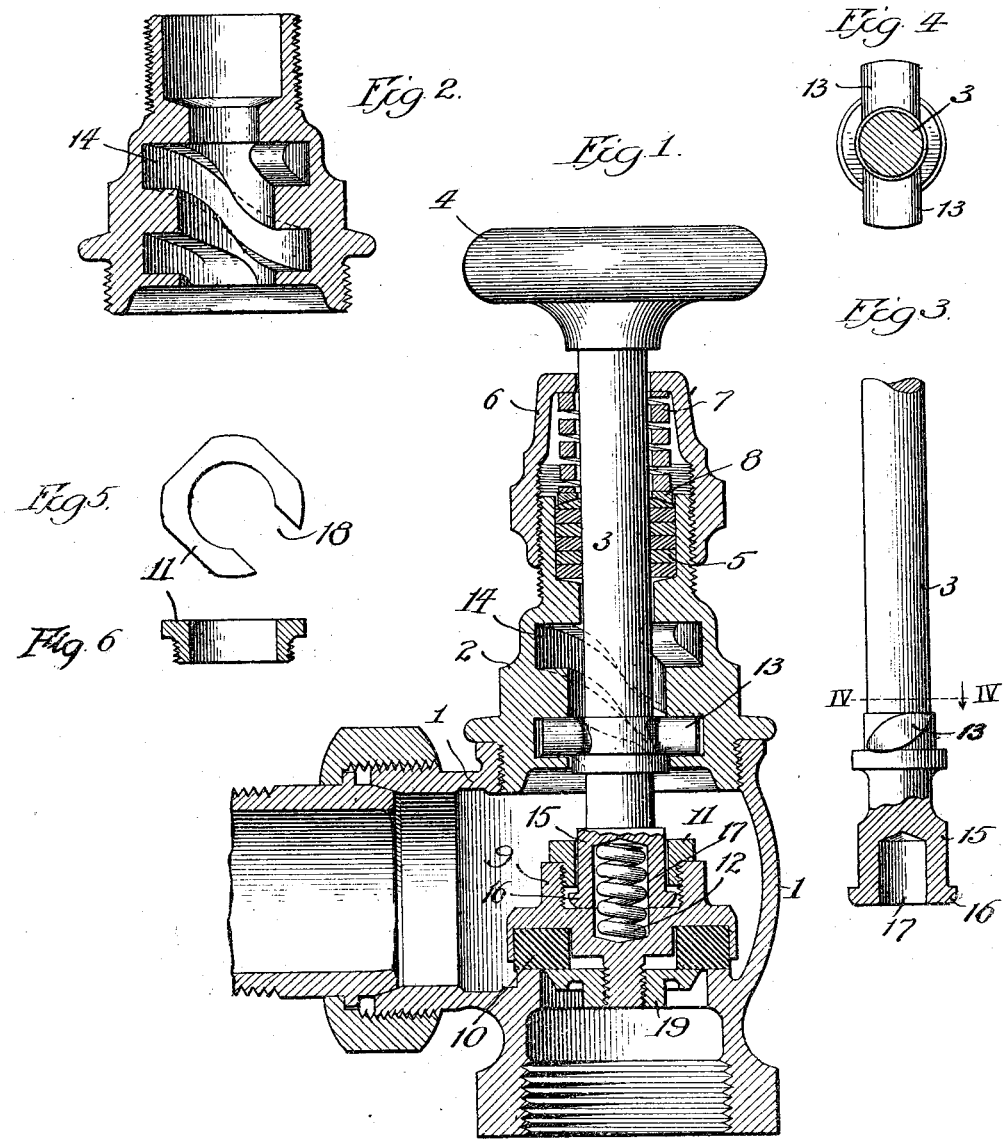

UNITED STATES PATENT OFFICE.

RICHARD TELLER CRANE, OF CHICAGO, ILLINOIS, ASSIGNOR TO CRANE COMPANY, OF CHICAGO, ILLINOIS, A CORPORATION OF ILLINOIS.

VALVE.

1,034,882.  Specification of Letters Patent.  Patented Aug. 6, 1912.

Application filed June 17, 1909. Serial No. 502,750.

*To all whom it may concern:*

Be it known that I, RICHARD T. CRANE, a citizen of the United States, residing at Chicago, in the county of Cook and State of Illinois, have invented certain new and useful Improvements in Valves, of which the following is a specification.

The invention relates to valves and particularly to the type known as quick-opening-radiator valves. It has for its principal objects; the provision of a valve having an improved and simplified form of connection between the valve stem and disk; the provision of a construction wherein the valve stem is made in a single piece and wherein the parts may be readily assembled; and the provision of an improved yielding connection between the stem and disk for maintaining the valve tightly closed regardless of any contraction of the stem or other parts of the valve. One embodiment of the invention is illustrated in the accompanying drawings, wherein:—

Figure 1 is a longitudinal section through a valve embodying the invention,

Figure 2 is a longitudinal section through the valve bonnet,

Figures 3 and 4 are detail views of the valve stem, Figure 3 being a side elevation partly broken away, and Figure 4 being a section on the line IV—IV of Figure 3, and Figures 5 and 6 are detail plan view and section through the thimble respectively.

Referring first to the general arrangement of parts as shown in Figure 1, the principal parts may be enumerated as follows. 1 is the valve body; 2 is the bonnet screw threaded to the body in the manner illustrated; 3 is the valve stem provided at its upper end with the handle 4; 5 is the packing seated in a recess in the upper end of the bonnet; 6 is the cap screw threaded upon the upper end of the bonnet; 7 is the spring for maintaining the packing tightly pressed in its recess about the stem, which spring carries at its lower end a brass follower ring 8; 9 is the valve disk recessed upon its lower side for the reception of the composition disk 10; 11 is a thimble screw threaded into the upper side of the valve disk and adapted to maintain the stem in position; and 12 is the spring interposed between the stem and disk for maintaining the valve tightly closed regardless of any contraction of the stem or other parts of the valve.

The valve stem is made in one-piece and is provided intermediate its ends with the two projecting wings 13, which wings are adapted to engage the spiral recess 14 in the bonnet, the arrangement thus providing for the quick operation of the valve. The lower end of the stem is provided with an enlargement 15 carrying at its lower end a flange 16, the end of the stem being provided with the recess 17 for the reception of the spring. As the stem is made in one piece and is provided with the projections or wings 13 and the head 16, the thimble 11 must be applied laterally over the stem, and to this end a passage or opening 18 (Fig. 5) just sufficient to pass over the stem above the enlargement 15 is provided. After the thimble is slipped over this portion of the stem, it is moved downwardly over the enlarged portion 15 and screw threaded into the valve disk as indicated in Figure 1. The fit between the thimble and the enlarged portion 15 of the stem is such as to prevent any lateral movement of the stem with respect to the thimble. There is a slight amount of lost motion between the head 16 and the lower end of the thimble 11, and the spring 12 is positioned under a certain amount of compression, so that after the valve is screwed down tight upon its seat it will remain in this position regardless of any subsequent contraction of the stem or composition disk, the spring causing the disk to move downward with respect to the stem as such contraction takes place. The composition disk is held in position by means of the usual nut 19 screw threaded upon the projecting stud at the lower side of the disk. It will be seen from the foregoing that the use of the cut-away thimble permits the use of an integral one-piece stem, and that the parts may be readily assembled without removing the stem from the bonnet. It will also be seen that the means for maintaining a tight joint between the valve disk and its seat is a simple and efficient one, and that the parts when assembled are securely held in position.

Having thus described my invention and illustrated its use, what I claim as new and desire to secure by Letters Patent is the following:—

In combination in a valve, a disk provided upon its upper surface with a spring receiving opening and a collar, a valve stem having at its lower end a head fitting inside the collar and provided with a spring receiving opening in line with the opening in the disk, a thimble screw threaded into the collar for maintaining the head of the stem in the collar and a coil spring mounted in the opposing openings in the stem and disk.

In testimony whereof I have hereunto signed my name in the presence of two subscribed witnesses.

RICHARD TELLER CRANE.

Witnesses:
W. E. PETERSON,
F. T. DONOHUE.